United States Patent

Orlowski

Patent Number: 5,865,441
Date of Patent: Feb. 2, 1999

[54] EMISSION SEAL

[76] Inventor: David C. Orlowski, 2901 106th Ave. W., Milan, Ill. 61264

[21] Appl. No.: 802,122

[22] Filed: Feb. 19, 1997

Related U.S. Application Data

[63] Continuation of Ser. No. 382,616, Feb. 2, 1995, abandoned.

[51] Int. Cl.$^6$ ............................... F16J 15/34; F16J 15/53
[52] U.S. Cl. ........................ 277/364; 277/366; 277/374; 277/378; 277/387; 277/388; 277/408
[58] Field of Search .................................. 277/3, 15, 39, 277/40, 41, 59, 61, 62, 63, 65, 71, 74, 79, 80, 93 R, 95, 96.1, 364, 366, 367, 374, 378, 387, 388, 401, 408

[56] References Cited

U.S. PATENT DOCUMENTS

| | | |
|---|---|---|
| 2,049,774 | 8/1936 | Hoffman . |
| 2,393,779 | 1/1946 | Hunter . |
| 2,836,440 | 5/1958 | Brumagim . |
| 2,853,020 | 9/1958 | Hollinger et al. . |
| 3,333,856 | 8/1967 | Voitik . |
| 3,402,937 | 9/1968 | Park et al. . |
| 3,489,419 | 1/1970 | Stratienko . |
| 3,740,057 | 6/1973 | Doyle et al. . |
| 4,305,593 | 12/1981 | Smith . |
| 5,161,804 | 11/1992 | Orlowski et al. . |

FOREIGN PATENT DOCUMENTS

661010  11/1951  United Kingdom .

OTHER PUBLICATIONS

Mechanical Seals, Second Edition, E. Mayer, Apr. 1973, pp. 26, 169, 170 and 212.

*Primary Examiner*—Anthony Knight
*Assistant Examiner*—John L. Beres

[57] ABSTRACT

The shaft seal assembly of cartridge designed for sealing shafts entering or exiting enclosed vessels. The enclosed vessels may have a pressure different from the atmospheric pressure and the seal will normally prevent leakage from or into the vessel. The seal is accomplished by having a plurality of fluid pressures presented to different faces or portions of the seals. Utilization of these pressures provides a seal between the faces of the rotating parts and the stationary parts of the seal with a minimum of friction. This reduced friction is a result of some amount of air movement between the sealing faces. This air movement into and out of the seal, resulting from fluid pressure differentials, will also carry away any contaminants that may get into the seal, either to the ambient atmosphere or to a recovery system. The seal is designed to accept axial and radial shaft displacement while maintaining a positive seal between the vessel and the atmosphere. The seal of this invention includes force loading of the rotating members toward the stationary members, each member with its own sealing face. The force of the loading means is modified by utilization of a first pressure to decrease the loading force and a second fluid pressure proportionate to the first fluid pressure applied to increase the loading force. The first and second fluid pressures provide a barrier to the flow of materials in either direction through the seal. The rotating members are driven by drive rings which also act as sealing members along the shaft.

13 Claims, 2 Drawing Sheets

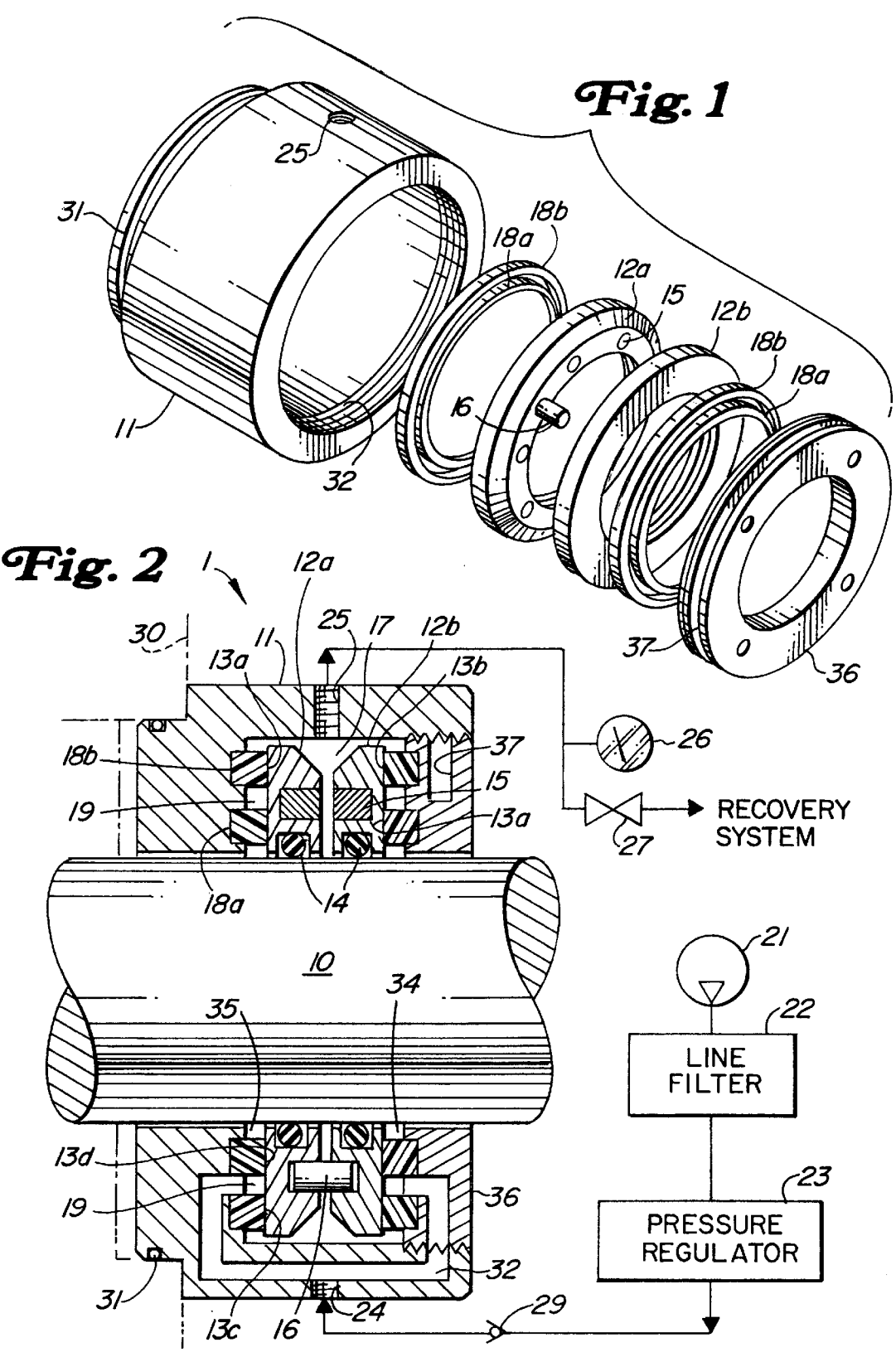

|  | | ROTATING SHAFT | | NON-ROTAT-ING SHAFT |
|---|---|---|---|---|
|  | | 1200 RPM | 1800 RPM | NA |
|  | | OUTLET PSI | OUTLET PSI | OUTLET PSI |
| INLET PSI | 4 | 1.9 | 2.0 | 1.81 |
|  | 5 | 2.4 | 2.6 | 2.25 |
|  | 7.5 | 4.0 | 3.83 | 3.8 |
|  | 10 | 5.3 | 5.38 | 5.22 |

*Fig. 3*

EMISSION SEAL

This is a continuation of application Ser. No. 08/382,616 filed on Feb. 2, 1995, now abandoned.

BACKGROUND OF THE INVENTION

1. Field of the Invention

For many years industry has been searching for a method and/or equipment to ensure that fugitive emissions from pumps, etc. were controlled. This control of undesirable fluid emissions is especially needed for the equipment, including pumps, vessels for batch materials, etc. where shafts exit a housing and any leakage around the exit and shaft is discharged into the atmosphere. It is also desirable, while preventing escape of said fluid emissions, to retain the fluids in the vessels or pumps without contamination from the exterior. This contamination matter may be fluid or solid. The provision of a seal, which would control emissions from the rotating equipment and prevent contamination into the equipment, is an object of this invention.

In the field of sealing it is desirable to have long life of the seal and total control of fugitive or other emissions, especially in this day of environmental concerns.

2. Related Art

Various forms of shaft sealing devices have been utilized to try to prevent the leakage of emissions from pumps, vessels having batch materials and/or other equipment utilizing rotating shafts which exit a housing. The housing will normally contain the material being pumped or mixed. The prior art has attempted to solve this problem of emission leakage, especially undesirable emissions by a variety of means, including sealless pumps, seals with liquid barriers and seals utilizing pressurized gasses such as air or nitrogen. The prior art has also attempted to solve the problem of emission leakage by introducing a seal having sealing members of different materials, such as carbon against ceramics. The prior art has also attempted to solve the problem of emission leakage by providing inert fluids between the rotor and the stator to minimize and improve the dissipation of the heat generated between the sealing faces, while not specifically and totally preventing the leakage of the materials. The prior art has utilized these various means to improve the emission control but has never provided for the positive removal and disposal of any contamination either by a liquid barrier or a pressurized gas. These prior devices did not remove the contaminations nor did they absolutely prevent the leakage of emissions.

The present invention utilizes controlled or uncontrolled absolute fluid pressures and controlled volumes of said pressures to ensure that any emissions leaking through the housing to the seal are removed to a proper disposal unit. This invention also provides an effective "dry running" mechanical seal utilizing the fluid pressures to minimize the frictional contact between sealing faces and indeed to control the frictional contact between the sealing faces.

The present invention utilizes a plurality of axial forces to effectively seal the equipment where the forces may be varied in strength without affecting the efficiency of the seal. The seal is also equally effective at any rotational velocity, and indeed performs in an identically predictable fashion as the rotational velocity is varied. This invention is also an excellent seal when emissions control are not necessary, i.e., no hazardous materials are involved, and will discharge into the atmosphere any leakage or debris which may be leaked into the seal.

This invention uses fluids, which may be air, gas, steam, and/or air-oil combinations which are introduced under pressure from an external source into the novel seal of this invention. The seal has a plurality of compartments formed within the chamber of the stationary member by a plurality of the sealing rings attached to the stationary member and the rotating members, including sealing faces. The stationary member also includes a separate passage for movement of fluid. The fluid is injected into the passage surrounding the rotating members and then is removed from the chamber through an outlet means, either to a recovery system or to the atmosphere.

This invention modifies the fluid pressure introduced to the chambers past the seal members and the rotational affect of the rotating members to produce and affect a pressure in a second chamber approximately one-half the fluid pressure introduced at the inlet.

BRIEF SUMMARY OF THE INVENTION

It is an object of this invention to provide an improved seal that is useful with reactor vessels, mixers, and/or pumps or other rotating equipment utilizing shafts entering and exiting vessels or housings. This improved seal utilizes face-to-face sealing and a plurality of different and variable fluid pressures as sealing means to positively seal the interior of the vessel or housing from the exterior. This improved seal may also be used in conjunction with a primary seal around a shaft in a pump housing and when so utilized can provide additional sealing plus the ability to control and remove fugitive or escaping emissions, especially fumes or gasses from the product leaking through the primary seal.

This invention relates to an improved sealing device where the sealing means is controlled by at least three separate axial pressures. A seal in accordance with this invention ensure a positive yet cool running and relatively frictionless seal. This invention also provides a seal which can be run dry or wet, i.e. with or without grease or lubricant or buffer as may be otherwise required. This invention also provides minimum wear on the sealing faces because of the interaction of the fluid pressures passing through and between the sealing faces.

This invention also has the capability of measuring the magnitude of wear on the seal without dismantling the seal. This measurement can also be taken under operating conditions, i.e. with or without the proper applied pressures without shaft rotation making it possible to predict and extrapolate the useful remaining life of the seal members. Such predictions will control the replacement of the sealing members to avoid costly catastrophic breakdowns.

This invention utilizes rotating elements, a stationary member including a chamber surrounding the rotating elements, and a compartment or cavity between the rotating members. Fluids under pressure are applied to the chamber through compartments. The pressure introduced into the seal of this invention is modified by the stationary sealing members and the rotational affect of the rotating members to become a pressure approximately one-half the pressure introduced at the inlet in another compartment. This fluid pressure in the second compartment will be approximately one-half the of the introduced pressure regardless of the value of the injected pressure. For any particular rotational velocity of the shaft, including zero (0), the back pressure or the secondary pressure is in the second chamber is related to the injected pressure by a predetermined, normally a directly proportional ratio, approximately one-half. This proportional ratio will increase slightly with rotational velocity, but still will remain approximately one-half of the injected pressure.

This invention includes a seal having a plurality of variable pressures applied to a plurality of fixed compartments in a fluid tight chamber where the compartments are not fluid tight. The resulting flow of the fluid pressures between the compartments through passages and between sealing faces results in an effective seal which is "dry running", nearly frictionless, and provides for positive control and removal of contaminants.

The seal of this invention has distinct portions of a manifold chamber or cavity which may be called compartments provided by the arrangement of the sealing members, the stationary member, and the rotating members. Different pressures will be applied to various compartments from various pressure sources. These fluid pressures are then applied in a variety of manners to the rotating members.

DESCRIPTION OF THE DRAWINGS

FIG. 1—is an exploded view showing the improved sealing device of this invention.

FIG. 2—is a sectional view of the improved sealing device of this invention mounted on a shaft and affixed to a housing.

FIG. 3—is a chart showing fluid pressures in various cavities at various rotational velocities of the shaft.

DETAILED DESCRIPTION OF THE INVENTION

Referring to FIG. 2, the seal assembly of this invention is shown mounted to a housing or frame 30. The rotating sealing members 12 are encased in a fluid tight stationary structure member 11. The structural or stationary housing member 11 includes inlet and outlet ports 24 and 25 for the introduction and removal of pressurized fluids from the chamber including cavity or compartment 17. Cap 36 has a cavity or compartment 37 which provide for the flow of pressurized fluid into passage 32. All of the operational units of this invention are included in a chamber formed in the stationary housing member 11 encompassing the resulting rotating members and compartments formed by the rotating members and the stationary housing member 11. Fluids under pressure, such as inert gasses, air, or steam may be introduced through the inlet port 24. A fluid pressure generation and control system including a fluid pressure generator 21, a line filter 22, pressure regulator 23, and check valve 29 are connected to the inlet port 24 and the flow of the pressurized fluid is as shown by the directional arrows. The fluid at a pressure different from and yet predictable from the inlet pressure and the seal mechanics of this invention exits the seal through exit or outlet 25. The discharge system may include sensors 26, valve means 27, and alternative connections to the atmosphere or to the recovery system 28. The recovery system will treat the contaminants as required under current safety or emission rules.

The particular design of the inlet and outlet systems for a particular seal and equipment being sealed, including the fluid pressure generator 21, the filters 22, pressure regulator 23, check valve 29, measuring sensing units 26, valves 27, and recovery system 28 are not shown in detail as one skilled in the art would devise a system necessary for the particular use.

The stationary housing member 11 encloses on three sides the rotating sealing members 12 in the chamber formed by the three sides. The rotating sealing members 12 are normally made out of hard materials, such as stainless steel or ceramic compounds, and may be solid or split. The rotating members 12a and 12b have sealing faces which rotate in contact with the sealing faces 13a–13d of sealing members 18a and 18b. The sealing members 18a and 18b are fitted into cavities formed in the stationary housing member 11. The seal members 18a and 18b are normally composed of sealing materials having a low coefficient of friction. Sealing members 18a and 18b form seals with the sealing faces 13a–13d and the sealing faces of rotating members 12a and 12b to permit the sealing function between these faces to vary within narrow limits. The pressurized fluid and its flow between compartments as pressures and rotational velocities vary results in a seal of variable values.

Rotating members 12a and 12b are axially biased and axially forced apart by the repelling magnets 15. The magnets 15 hold the rotating members 12a and 12b firmly in a proper axial position against the sealing faces 18a and 18b of the sealing members. The sealing members 18a and 18b would normally be made of Teflon® (Dupont), Teflon® derivatives or other engineered plastics, carbon or carbon based compounds, which have a low coefficient of friction, are inert to chemical attack and can withstand operating temperatures up to 500 degrees fahrenheit.

Rotating members 12a and 12b are in this embodiment rotated with the shaft 10 by the driving and sealing rings 14. These rings 14 are connected to the shaft 10 by friction. These rings 14 are normally made of elastomeric material and may be encapsulated with an inert material. The frictional drive from shaft 10 provided by the rings 14 rotates the rotating members 12a and 12b and simultaneously seals the shaft 10. Other normal means of rotating the rotating members 12a and 12b with the shaft 10, such as being keyed to the shaft 10 may augment the rings 14. However, some sealing means, such as that provided by rings 14 when they are made of elastomeric material must be provided to ensure proper operation, including the sealing of rings 14 to shaft 10.

As noted in U.S. Pat. No. 5,161,804, the magnets 15 must be maintained with the like poles opposite each other and may be secured by pins 16 or other means for simultaneous rotation. The rotors must rotate together and maintain the magnet members opposed.

The passage 32 in stationary housing member 11 connects the inlet means 24 with compartment 19. Cap 36 includes a cavity 37 which provides for the flow of fluid to passage 32. The compartment 19 is defined by the passage 24 and the rotating members 12a and 12b. A plurality of compartments and/or cavities are formed into a manifold by the various elements of the seal in the chamber in the stationary housing member 11, including all of the compartments or cavities. Compartments 34, 35, and 17 are defined by specific portions or sections of the stationary housing member 11, rotating members 12a and 12b, sealing members 18a and 18b, and shaft 10.

Compartment 17 is defined by portions of stationary housing member 11, shaft 10, rotating members 12a and 12b, and sealing means 18b. Compartment 17 is connected to exit means 25.

Compartment 34 is defined by portions of stationary housing member 11, shaft 10, sealing member 18a, rotating member 12b and is open to the atmosphere by the passage created by the clearance between the stationary housing member 11 and the shaft 10. Compartment 35 is defined by portions of stationary housing member 11, shaft 10, sealing member 18a, rotating member 12a, and is open to the housing 30 via the passage created by the clearance between the stationary housing member 11 and the shaft 10. Compartment 17 is defined by portions of stationary housing member 11, rotating members 12a and 12b, shaft 10, sealing members 18a and 18b, driving and sealing members 14, and connected to fluid exit 25. These compartments are selectively in communication when fluid pressure is applied and the resulting fluid flow between the sealing faces 13a–13d and rotating members 12a and 12b.

The initial fluid pressure generated by fluid pressure generator 21 is applied through inlet 24 to passageway 32 and is then compartment 19 in the stationary housing member 11. The resulting fluid pressure in passage 32 and chamber 19 is directly and axially biased against the sides of rotating members 12a and 12b. This fluid pressure applied to axially bias the rotating members 12a and 12b against said biasing means 15. The pressure applied in chamber 19 then migrates through the faces 13a and 13b between the sealing members 18, 12a and 12b to chamber 17. This fluid flow between chambers 19 and 17 occurs because of pressure differentials between the chambers. The fluid pressure now present in chamber 17 biases in opposition to the fluid pressure exerted on rotating members by the pressure in chamber 19 and complementing said biasing means 15.

The flow of fluid under pressure from chamber 19 to chamber 17 results in a minimal physical contact between the sealing faces of the rotating members 12a and 12b and the sealing faces 13a and 13b of the sealing members 18. The flow ensures minimal friction between the sealing faces of stationary and rotating seal members and permits the seal to run cool and have a minimum amount of wear on the seal faces of sealing members 18.

During the operation of this seal the fluid pressures applied to the chamber 19 produce fluid pressures in chamber 17 directly proportional to the fluid pressure in chamber 19. The fluid pressure in chamber 17 is approximately one-half the pressure in chamber 19.

FIG. 3 provides a plurality of readings taken of valves in chamber 17 with different fluid pressures applied in chamber 19 and with different rotational velocities of the shaft 10. These readings show that there is a constant and direct relationship between the fluid pressures in the chamber 17 and the chamber 19. The value of the fluid pressure in chamber 17 for a given valve in chamber 19 increases slightly with a higher rotational velocity of shaft 10, but remains approximately one-half the value of the injected fluid pressure at inlet 24 or chamber 19.

As shown by the readings taken during operation and recorded in FIG. 3, the fluid pressure $P_1$ applied to the passageway 32 is always greater than the pressure $P_2$ in the chamber 17. $P_1$ is always approximately twice $P_2$. There is only one passage available for the fluid under pressure to pass from chamber 19 into the chamber 17. That passage is created by relieving the contact or the sealing forces on the rotating members 12a and 12b. As explained previously, this will change the efficacy of seal between the degree of closure of the sealing faces 13a and 13b and the sealing faces on the rotating members 12a and 12b.

Any increase in $P_1$ or the pressure injected will result in a proportional increase in $P_2$ that is the residual pressure in chamber 17. The pressure $P_1$ in chamber 19 forces or biases the rotating members 12a and 12b together while the axial force or bias exerted by $P_2$ in chamber 17 forces the rotating members 12 apart in conjunction with the biasing means magnet or spring members 15.

The fluid pressure or any leakage from the pump or primary seal, if one is used between the seal of this invention and the rotating machinery, i.e., pump or housing 30, is applied to the chamber 35 in the path created by the clearance between the shaft 10 and the stationary housing member 11. This leakage or pressure is directed across the sealing faces 13b and 13c into the collection chamber 17 and may establish a new pressure $P_3$. This new pressure $P_3$ may now be greater than normal pressure $P_2$ in chamber 17 which will then close the sealing faces 13a and 13d so that escapement to the atmosphere is prevented and the undesirable fluids or emissions, are projected under pressure to the exit 25 and then to a waste disposal recovery system 28.

Sensors in the exit stream will recognize the nature of the escaping fluids and measures may be taken to correct the leakage at the housing. If the escaping fluid pressure from the pump or a primary pump seal is of sufficient magnitude to overcome both the injection pressure $P_1$ and the resulting pressure $P_2$ in chamber 17, the undesirable fluids will be confined within the collection chamber 17 having passed through the sealing faces 13b and 13c and the new pressure $P_3$ is an elevated pressure which will affect a secure and positive closure of the sealing surface by axial pressure on the rotating members 12a and 12b. While this maximum pressure is being experienced, sensors may be programmed to shut-down the pumping equipment even though the escaping contaminating fluids are being sent to the recovery system 28. A check valve 19 inhibits the flow of emissions at $P_3$ from back flowing into the source of $P_1$.

Bronze, stainless steel, titanium or other metals, or engineered plastic may be used for the construction of the collection chamber while stainless steel is the preferred materials for the rotating faces. Ceramic material or other similar hard material may also be used to make sealing faces on the rotating members 12a and 12b. PTFE derivatives are preferred for the stationary sealing faces 13a–13d although carbon compounds or other similar materials may be used, including ceramic compounds, such as silicon or tungsten carbide.

This sealing mechanism is not affected by rotational velocity and does not depend upon a minimum rotational velocity in order to introduce fluid between the sealing faces of the rotor and stator as is the case with prior art gas seals. This seal is also not sensitive to high rotational speeds since it is prevented from having sustained physical frictional contact between the sealing faces of the stationary and rotating members at all times. The escapement of fluid and the resulting minute axial separation between the sealing faces of the rotating members 12a and 12b and the sealing faces 13a and 13d of the stationary member when the pressurized fluid migrates from chambers 19 to 17 serves to prevent excessive face wear.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appended claims.

What is claimed is:

1. A seal adapted for sealing and controlling emissions from a rotating shaft exiting rotating machinery, said seal exposed to varied fluid pressures comprising:

a) a stationary housing member surrounding said shaft and adapted to be fixed to said machinery, said housing member defining a chamber therein;

b) a plurality of rotating members within the housing, said rotating members surrounding said shaft and rotatable therewith;

c) a plurality of sealing means projecting from said housing into said chamber, each of said sealing means having a sealing face to form a seal with said rotating members to a plurality of fluid pressures;

d) said sealing means comprising inner and outer sealing members radially separated from each other;

e) biasing means for axially biasing and positioning said rotating members;

f) a fluid inlet in said stationary housing member to supply a first fluid under controlled pressure to said rotating members to axially bias said rotating members against said biasing means;

g) a fluid outlet in said stationary housing member communicating with said chamber to receive a second fluid under pressure, said second fluid having a different pressure and said second fluid to actually compliment said biasing means;

h) a third fluid under pressure applied to said rotating members to bias said rotating members against said biasing means whereby said axial biases interact with said sealing faces to seal said chamber.

2. The invention in accordance with claim 1, wherein said sealing members form a compartment with the housing and the rotating members.

3. The invention in accordance with claim 2, wherein said sealing members seal between the fluid pressure in the machinery and said first fluid pressure.

4. The invention in accordance with claim 2, wherein said inner sealing member seal between atmospheric pressure and said first fluid pressure.

5. The invention in accordance with claim 2, wherein said outer seal member seals between said first and said second fluid pressures.

6. The invention in accordance with claim 2, wherein said first fluid pressure is greater than the other fluid pressures.

7. The invention in accordance with claim 1, wherein when said machinery fluid pressure exceeds said first fluid pressure said machinery pressure will exit with said second fluid.

8. The invention in accordance with claim 1, wherein said second fluid pressure is less than said first fluid pressures supplied to bias said rotating members.

9. The invention in accordance with claim 1, wherein said second fluid pressure is proportional to said first fluid pressure supplied to bias said rotating members.

10. The invention in accordance with claim 1, wherein said rotating members are connected to said shaft for rotation therewith.

11. The invention in accordance with claim 1, wherein said rotating members are connected and sealed to said shaft by elastomeric rings.

12. The invention in accordance with claim 1, wherein said biasing means are repelling magnets.

13. The invention in accordance with claim 2, wherein said fluid pressures communicate past said sealing faces between the sealing members and said rotating members into compartments within said chamber to said fluid outlet.

* * * * *